UNITED STATES PATENT OFFICE.

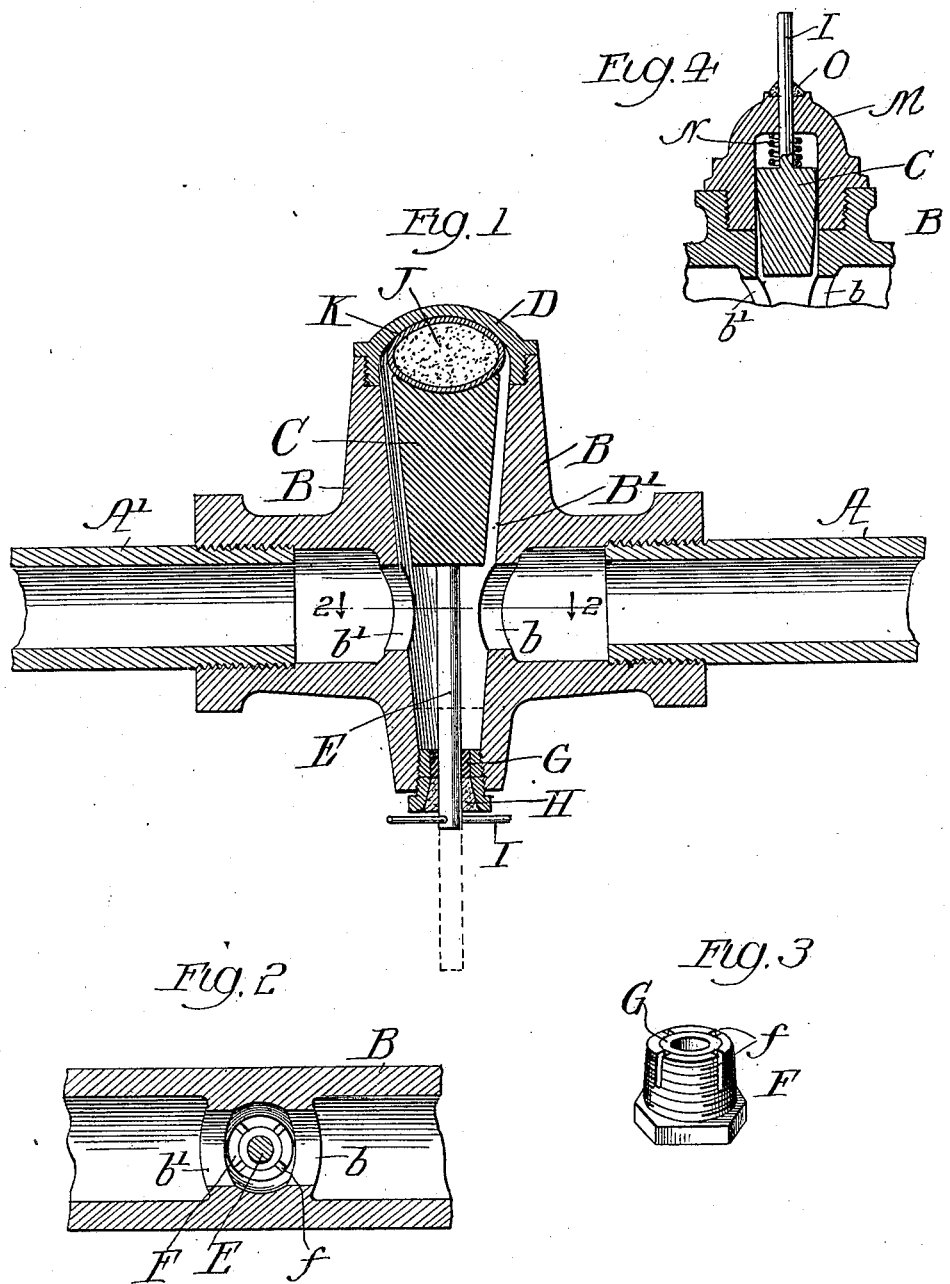

ADOLPH W. JENCZEWSKY, OF CHICAGO, ILLINOIS.

SAFETY-VALVE FOR GAS-PIPES.

No. 824,933.　　　　Specification of Letters Patent.　　　Patented July 3, 1906.

Application filed May 10, 1905. Serial No. 259,814.

*To all whom it may concern:*

Be it known that I, ADOLPH W. JENCZEWSKY, a citizen of the United States, residing at Chicago, in the county of Cook and State of Illinois, have invented certain new and useful Improvements in Safety-Valves for Gas-Pipes; and I do hereby declare that the following is a full, clear, and exact description thereof, reference being had to the accompanying drawings, and to the letters of reference marked thereon, which form a part of this specification.

This invention relates to an automatically-acting or self-closing safety-valve intended to be applied to a supply-pipe for illuminating-gas at a point within a house or building and adapted to close the pipe against the passage of gas from the main in case a fire occurs within said house or building.

The invention consists in the matters hereinafter described, and pointed out in the appended claims.

In carrying out my invention I provide the gas-supply pipe within the cellar or basement of the building, between the gas-meter and the point where the pipe enters the building, with a valve having a movable part or closure so constructed that it has a tendency to assume a closed position either by gravity of the parts or by means of an actuating-spring, together with means for holding the valve normally in its open position, embracing a fusible connection so constructed and arranged that when it is melted by heat the valve-closure will be released and effectively close the valve. Means for holding the valve-closure open consists of a rod or stem attached to or moving with the closure and a split thimble inserted in the wall of the valve-casing and through which the said stem or rod passes, said thimble being provided with a lining or bushing of fusible metal, such as lead, which lining or bushing surrounds the rod or stem and is clamped thereto by the action of the split part of the bushing when the latter is screwed into its place in the casing.

My invention also includes, as an additional feature, a mass or cartridge of explosive material located in contact with a thin outer part of the wall of the casing in such manner that it will act, when exploded, upon the valve-plug in a direction to throw the same into its closed position, such explosive being adapted for ignition by heat transmitted thereto through the part of the wall of the casing with which it is in contact.

As illustrated in the accompanying drawings, Figure 1 is a view in central longitudinal section of a valve embodying my invention. Fig. 2 is a horizontal section taken on line 2 2 of Fig. 1. Fig. 3 is a perspective view of the split thimble severed from the other parts. Fig. 4 illustrates a modified form of the connection between the valve stem or rod and the surrounding casing through which said stem or rod passes.

As shown in the said drawings, A indicates a pipe leading from a gas-main, A' a pipe leading to a meter or toward the distributing-pipes of the building, and B a valve-casing connecting the pipes A and A'. Said casing B has a vertically-arranged valve-chamber B', which is tapered or conical on its lower part. The said valve-chamber B' extends transversely across the main passage through the valve-casing B and is provided with opposite lateral ports $b\ b'$, constituting parts of said passage.

C is a valve closure or plug of conical form adapted to fit within the conical lower portion of the valve-chamber B' in such manner as to close the ports $b\ b'$, but which may be lifted into the upper part of the seat or chamber B', so as to afford free passage of gas from one to the other of said ports. The top of the valve-chamber B' is closed by means of a cap D, preferably connected therewith by screw-threaded joint. The valve-plug C is provided with a downwardly-extending stem E, which passes at its lower end through a thimble F, which has screw-threaded engagement with the valve-casing at the lower end of the valve-chamber B' and which serves to close the lower end of said valve-chamber. The thimble F is provided at its inner end with longitudinal slits $f$ and within said inner end with a bushing or lining G, of lead or other fusible metal. When the thimble F is screwed into the casing, the parts thereof between the slits $f$ are contracted, thus compressing the soft-metal bushing G around the stem E, so as to both hold said stem from downward movement and to afford a tight joint or connection between the stem and the surrounding thimble. Said thimble F will be screwed into the opening of the casing far enough to bring the slits $f$ entirely within the said opening, so that the solid part of the thimble outside of the said slits will engage the walls of the opening, and thus make a tight joint between the thimble and the casing.

The bushing G being made of easily-fusible metal, such as lead, in case the device is heated above the melting-point of such fusible metal by the head of fire in the neighborhood of the valve the bushing will be melted, and thus release the rod E, permitting the valve-closure to fall and close the valve.

I preferably make the fusible-metal bushing G shorter than the length of the thimble F and locate said ring at the inner part of said thimble, leaving an interior space at the outer part thereof, which is filled by a ring or mass H, of celluloid or other inflammable material. Such filling H, of celluloid or the like, will be ignited by contact of flames therewith and in burning generates heat sufficient to insure the melting of the fusible-metal bushing G. I preferably make the outer part of the bore of the thimble F of outwardly-tapering form, as shown, so that the outer surface of the combustible filling H is of considerable width, thereby giving larger surface for exposure to flames in the neighborhood of the valve and insuring more rapid combustion of the inflammable material when ignited.

As a still further improvement I extend the end of the rod E somewhat below the thimble F and provide the same with a transverse aperture, in which is inserted a rod or strip I, of celluloid or other inflammable material, the ends of which extend from the rod beneath and adjacent to the inflammable filling H. Such a rod or strip I will be readily ignited by flames, and as soon as ignition thereof takes place the heat thereby produced quickly ignites the inflammable filling H, thus insuring quick and rapid burning of the latter.

As a still further improvement in valves of this character I provide between the top of the valve-closure C and the cap D of the casting a mass or cartridge J of gunpowder or other explosive. In the particular construction illustrated the mass of explosive J is surrounded or inclosed by an air-tight and waterproof shell K, preferably made of celluloid, and which serves to confine the explosive and to protect the same from action of moisture or gases. The top of the plug C is preferably made concave and the inner surface of the cap D of corresponding shape, while the inclosing shell K of the explosive cartridge is made of rounded form, so as to fit the cavity formed between the concave faces of the plug and cap. The said cap D is made as thin as consistent with proper strength, so that it is adapted to readily transmit to the explosive charge igniting heat from flames that come in contact with the casing.

The explosive charge or cartridge arranged in the manner described serves to insure the seating of the valve-closure whether the fusible-metal ring G be melted out before the explosive is ignited or not. Primarily the purpose of the explosive cartridge is to force the plug into its seat, and thus insure the certain cutting off of the passage of gas through the pipes, the force of the explosive being sufficient to disrupt the connection between the rod or stem E and the casing, and thus insure the closing of the valve when the explosive charge is ignited. If the bushing G be melted out and because of corrosion of the parts or for other reason the valve fails to properly close by gravity, the cartridge will finally be exploded when the casing is sufficiently heated to effect ignition and the plug driven forcibly into its closed position.

As the thimble provided with the fusible-metal bushing affords a tight joint or connection between the rod E and the casing and as the top of the valve-chamber is closed by the cap D, the valve-casing is permanently closed, and no leakage of gas therefrom can occur.

In Fig. 4 I have shown a modified construction in a safety-valve embracing a fusible-metal bushing or ring which serves the same purpose as the bushing G in both holding the rod from endwise movement and forming a tight joint between the rod and the part of the casing through which the rod passes. In this case the valve-plug C has a stem which rises through a cap M, constituting the upper part of the valve-casing. A coiled expansively-acting spring N is interposed between the cap M and the valve-plug C and tends to throw the latter into its closed position. A ring O, of lead, solder, or other fusible metal, surrounds the rod or stem I and forms a tight joint between the stem and the cap M, the fusible metal being adherent both to the stem and the cap, the fusible metal being applied in a molten state, as is done in soldering two metal parts together. The ring thus applied forms a gas or air tight joint between the stem and casing, in this respect acting in the same manner as the ring or bushing G, which is clamped to the stem by the action of the split thimble F, the fusible-metal ring in both cases being adapted to be melted by heat, so as to release the stem and permit the closing of the valve.

In both forms of the device described the rod projects beyond or outside of the fusible-metal ring by which it is connected with the casing. One advantage of this construction is that heat is conveyed by the rod from its outer end directly to the fusible ring to insure the prompt fusing of the latter and release of the valve-closure. Another advantage is that the outer end of the rod being exposed or projecting outside of the valve-casing the valve may be quickly closed by a blow on the rod in cases where such action is found practicable or desirable before a fire in a building reaches the immediate vicinity of the valve.

I claim as my invention—

1. A safety-valve for gas-pipe comprising a valve-casing, a movable valve-closure, a stem or rod attached to the closure and extending outwardly through the valve-casing and a ring of fusible metal surrounding the rod and through which the latter projects, said ring constituting a tight closure between the said rod and the surrounding part of the casing and serving to connect the rod with the casing in a manner to hold the closure from movement.

2. A safety-valve for gas-pipes comprising a valve-casing, a movable valve-closure, and means for holding said closure in its open position embracing a rod or stem, and a split thimble through which said rod extends, said thimble being provided with a bushing of fusible metal.

3. A safety-valve for gas-pipes comprising a valve-casing, a movable valve-closure and means for holding said closure in its open position embracing a rod or stem, and a split thimble through which said rod extends, said thimble being provided with a bushing of fusible metal and with an external filling of inflammable material.

4. A safety-valve for gas-pipes comprising a valve-casing, a movable valve-closure, and means for holding the closure in its open position embracing a stem or rod which extends outwardly through the wall of the casing, a ring of fusible metal forming a tight joint between the rod or stem and the casing, and a mass or filling of inflammable material located outside of and in contact with said fusible-metal ring.

5. A safety-valve for gas-pipes comprising a valve-casing, a closure which has a tendency to assume a closed position, and means for holding said closure in its open position embracing a rod or stem, and a split thimble through which said rod extends, a bushing of fusible metal in said thimble an external filling of inflammable material in said thimble, and a strip or bar of inflammable material attached to said rod outside of the bushing.

6. A safety-valve for gas-pipes comprising a valve-casing, a closure which has a tendency to assume a closed position, and means for holding said closure in its open position embracing a rod or stem, a split thimble through which said rod extends, said thimble being provided with a bushing of fusible material, and an explosive mass or cartridge located in contact with the outer wall of the casing and adapted to act upon the closure in a direction to throw the same into its closed position.

7. A safety-valve for gas-pipes comprising a valve-casing having a transverse valve-chamber, a movable valve-plug in said chamber, a removable cap closing the chamber at its end outside of said plug, a screw-threaded thimble inserted in the opposite end of said chamber and closing the same, and a rod which holds the valve-plug in its open position and passes through said thimble; said thimble being provided with a ring or bushing of fusible metal.

In testimony that I claim the foregoing as my invention I affix my signature, in presence of two witnesses, this 6th day of May, A. D. 1905.

ADOLPH W. JENCZEWSKY.

Witnesses:
C. CLARENCE POOLE,
I. R. VILKINS.